United States Patent
Molina et al.

(10) Patent No.: US 6,954,567 B2
(45) Date of Patent: Oct. 11, 2005

(54) APODISED COMPLEX FILTER

(75) Inventors: Marianne Molina, Paris (FR); Carlos De Barros, Boulogne-Billancourt (FR); Isabelle Riant, Orsay (FR)

(73) Assignee: Avanex Corporation, Fremont, CA (US)

(*) Notice: Subject to any disclaimer, the term of this patent is extended or adjusted under 35 U.S.C. 154(b) by 12 days.

(21) Appl. No.: 10/423,980

(22) Filed: Apr. 28, 2003

(65) Prior Publication Data

US 2003/0202745 A1 Oct. 30, 2003

(30) Foreign Application Priority Data

Apr. 29, 2002 (FR) ............................................ 02 05376

(51) Int. Cl.[7] .............................................. G02B 6/34
(52) U.S. Cl. ...................................................... 385/37
(58) Field of Search .................... 385/10, 37, 123–124, 385/129; 438/31, 32; 398/84, 87, 149; 359/337.21, 572, 573

(56) References Cited

U.S. PATENT DOCUMENTS

| | | | |
|---|---|---|---|
| 3,814,498 A | | 6/1974 | Tomlinson, III et al. |
| 6,005,999 A | * | 12/1999 | Singh et al. ................... 385/37 |
| 6,130,973 A | * | 10/2000 | Lauzon et al. ................ 385/37 |
| 6,314,220 B1 | * | 11/2001 | Mossberg et al. ............. 385/37 |
| 6,317,539 B1 | | 11/2001 | Loh et al. |
| 6,337,933 B1 | * | 1/2002 | Brenner ........................ 385/15 |
| 6,553,163 B2 | * | 4/2003 | Tormen ........................ 385/37 |
| 2003/0059165 A1 | * | 3/2003 | Belmonte et al. ............. 385/37 |
| 2003/0185509 A1 | * | 10/2003 | Bailey et al. ................. 385/37 |

FOREIGN PATENT DOCUMENTS

EP 0897124 A1 2/1999

OTHER PUBLICATIONS

I. Riant et al, "Gain Equalization with Optimized Slanted Bragg Grating on Adapted Fibre for Multichannel Long–Haul Submarine Transmissions", OFC/IOCC '99 Optical Fiber Communication Conference; International Conference on Integrated Optics and Optical Fiber Communication. San Diego, CA Feb. 21–26, 1999, pp. THJ6–1–THJ6–3, XP000967012.

Y. Liu et al, "Fabricating Fibre Edge Filters with Arbitrary Special Response based on Tilted Chirped Grating Structures", Measurement Science and Technology, IOP Publishing, Bristol, GB, vol. 10, No. 1, Jan. 1999, pp. L01–L03, XP000877675.

* cited by examiner

Primary Examiner—Frank G. Font
Assistant Examiner—Christopher M. Kalivoda
(74) Attorney, Agent, or Firm—Moser, Patterson & Sheridan, LLP

(57) ABSTRACT

An optical filter composed of a concatenation of elementary filters consisting of chirped slanted Bragg gratings written on a continuous portion of an optical waveguide, characterized in that the various gratings in the concatenation have the same angle, identical lengths and a linear chirp.

10 Claims, 3 Drawing Sheets

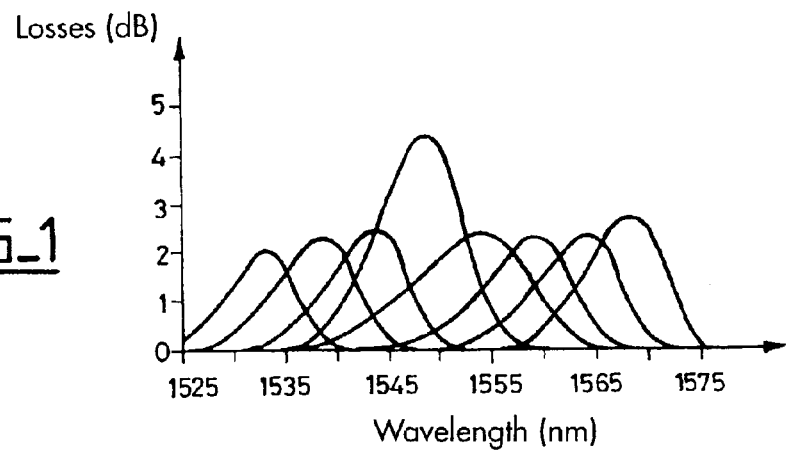
FIG_1
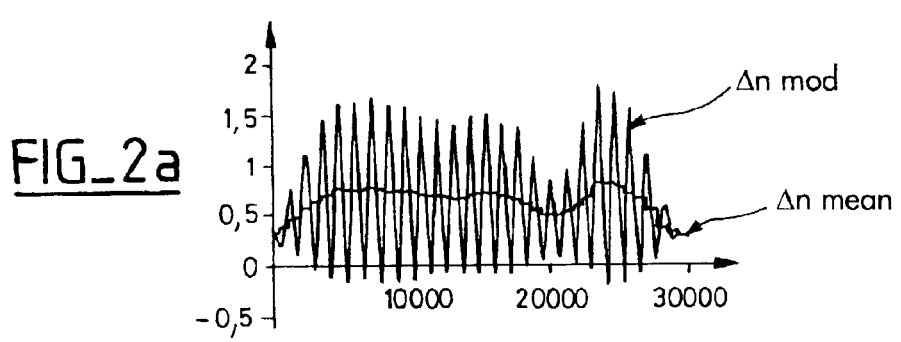
FIG_2a
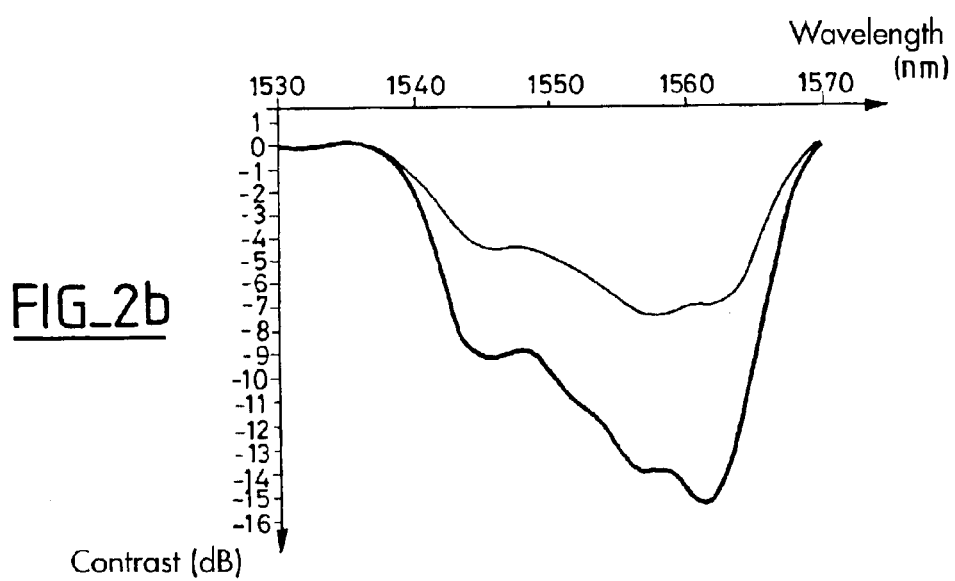
FIG_2b

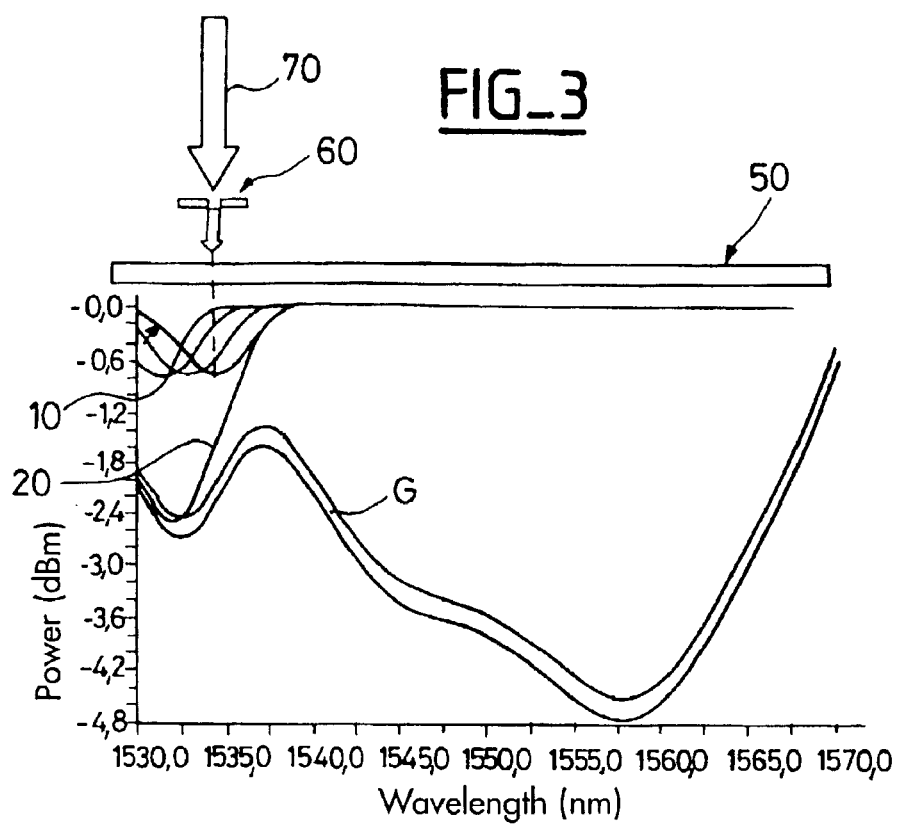
FIG_3
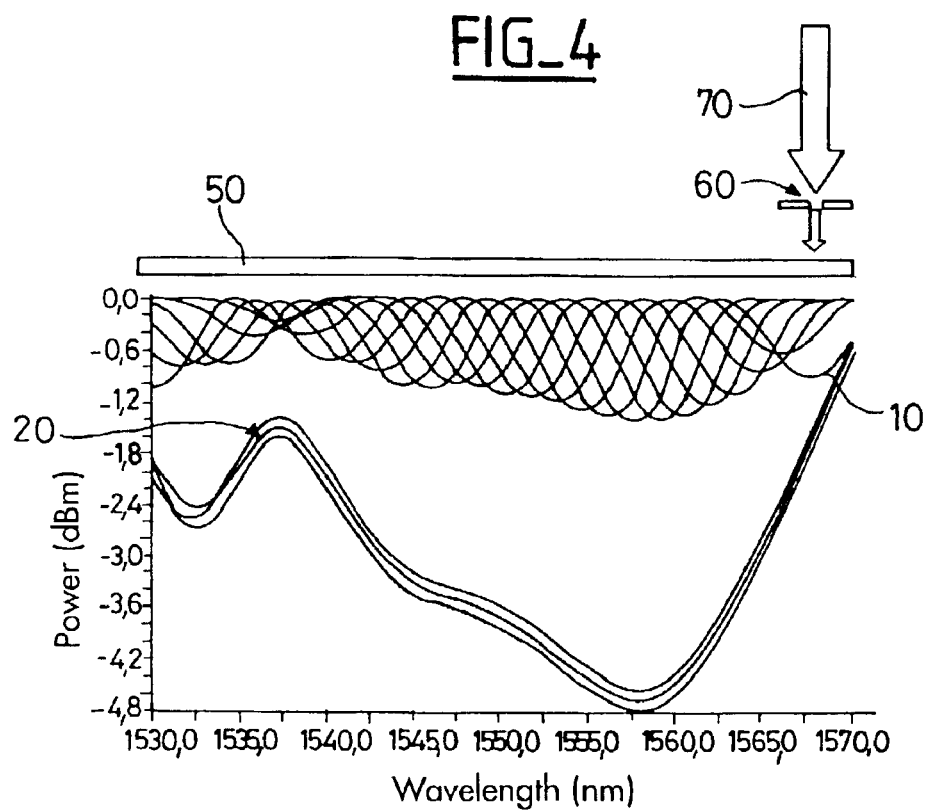
FIG_4

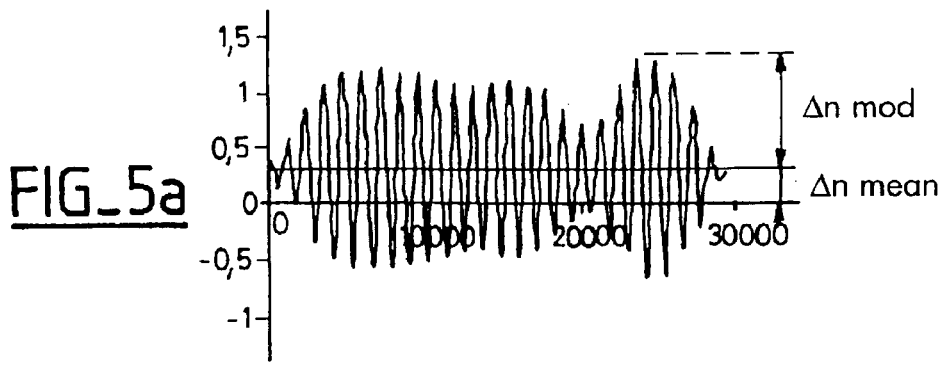
FIG_5a
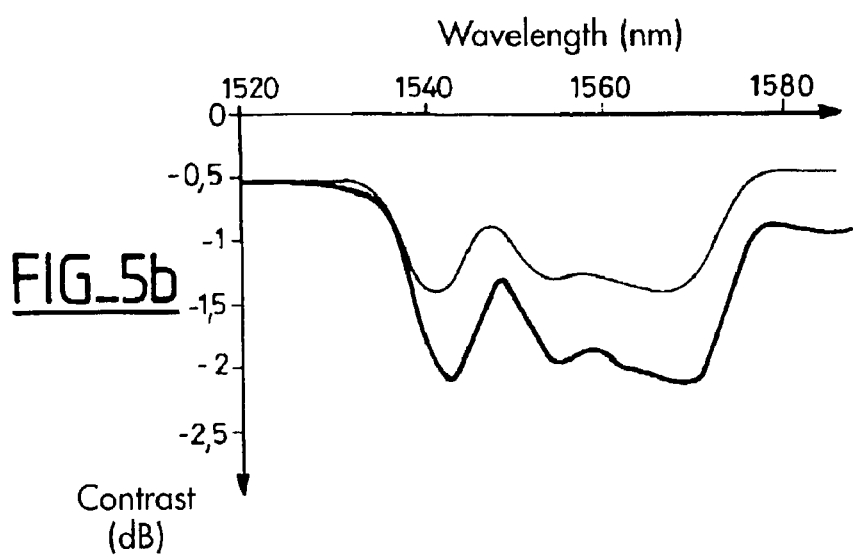
FIG_5b
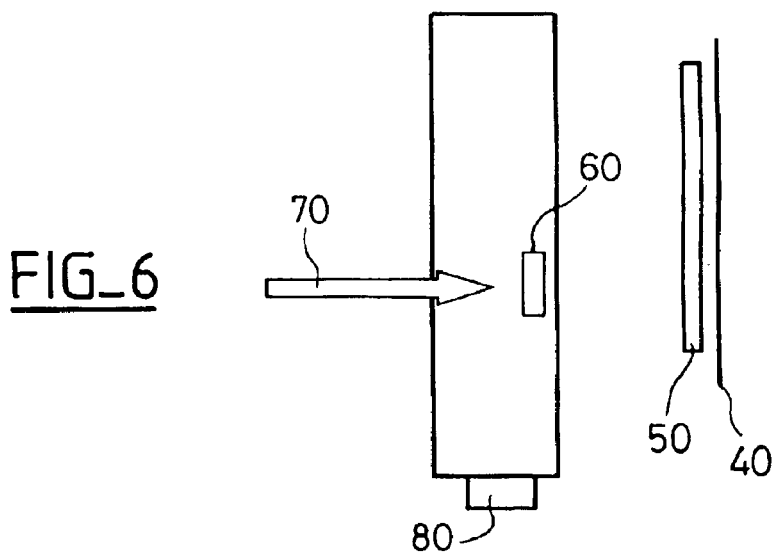
FIG_6

APODISED COMPLEX FILTER

BACKGROUND

1. Field of the Invention

The present invention concerns the field of optical filters consisting of Bragg gratings photo-written in waveguides. The invention concerns more particularly gain-equalising filters.

2. Description of the Prior Art

Gain-equalising filters, also known by the acronym GFF, standing for Gain Flattening Filter, in general consist of Bragg gratings photo-written on portions of waveguides such as optical fibres or planar guides. A waveguide is conventionally composed of an optical core whose function is to transmit and possibly amplify an optical signal, surrounded by an optical cladding whose function is to confine the optical signal in the core. To this end, the refractive index of the core n1 and cladding n2 are such that n1>n2. As is well known, the propagation of an optical signal in a single-mode waveguide breaks down into a fundamental mode guided in the core and secondary modes guided over a certain distance in the optical core/cladding assembly, also referred to as cladding modes.

The core and/or cladding of the guide can be doped so as to be made photosensitive for a Bragg grating writing, for example with germanium (Ge). The gratings conventionally used for gain flattening are slanted gratings, known by the term SBG, standing for Slanted Bragg Grating, or long-period gratings, known by the term LPG, standing for Long Period Grating. Such gratings are non-reflective and are designed to allow coupling of the fundamental mode in the cladding modes. It is also possible to dispense with the optical isolators which are essential when the gain flattening is achieved with reflective gratings such as straight Bragg gratings.

Gain flattening filters are associated with optical amplifiers regularly distributed along transmission lines. Optical amplifiers do not generally provide equal amplification for all wavelengths of the signals transmitted over the various channels of the same transmission line.

In particular, with the development of dense wavelength division multiplexing (DWDM) transmission applications, the disparities in amplification on a given passband have a tendency to be accentuated and the tolerances of the gain flatteners become less and less, that is to say the flattening filter must follow the amplification curve as closely as possible. Thus DWDM applications require the production of narrower and narrower filters exhibiting more and more accentuated contrasts.

The gain flattening profiles are therefore becoming more and more complex and the manufacturing constraints are pushing for minimising the number of writings of gratings per filter.

In the case of slanted gratings (SBGs) for gain flattening applications as presented above, various solutions for writing these gratings can be envisaged for producing a complete flattening filter.

A first known solution consists of writing various SBGs on various waveguides in order to constitute so-called elementary filters each adapted to a portion of the spectral amplification band to be flattened. Several SBGs are then selected, according to the flattening required, and associated with one another in order to form a so-called complex filter. In general, the various SBGs are assembled by welding the various waveguides. Such a technique is however not optimal since the welds on the various elementary filters introduce significant insertion losses.

To mitigate this drawback, it has been proposed to write the various slanted gratings on different portions of the same waveguide. Such a solution is described in the patent application WO 93/24977. The graph in FIG. 1 illustrates the spectrum of the losses of eight uniform SBGs written with an angle of 8° on the same guide portion in order to form a complex filter whose spectral response is the sum of the spectral responses of each SBG. According to the contrast given to each grating, it is thus possible to model the response of the complex filter.

This solution does however require as many writings through as many phase masks as there are elementary filters. The more complex the gain flattening profile, the higher the number of elementary SBG writings necessary for producing the complex flattening filter, which makes the manufacture of such filters more expensive.

SUMMARY OF THE INVENTION

A first object of the present invention is to respond to the problems of the prior art disclosed above and to propose a gain flattening filter with a complex spectral profile which exhibits reduced insertion losses and whose design is compatible with mass production constraints.

To this end, the invention proposes to write a plurality of slanted gratings through a single highly chirped phase mask, that is to say one whose period varies greatly along the mask. These elementary gratings can be written in a single step on the same optical guide portion in order to form a complex filter, which considerably reduces the steps of manufacturing the complete flattening filter and improves the optical quality of the filter by reducing the insertion losses.

However, such a method of writing slanted gratings through a single highly chirped mask has certain drawbacks.

This is because, when any filter is written, there is caused intrinsically in the optical guide on the one hand a modulation of the refractive index dependent on the amplitude of the interference fringes and on the other hand a mean refractive index dependent on the visibility of the fringes different from 1. The contrast of an elementary filter consisting of a written grating is directly related to the combination of these two components. Thus two elementary filters can have the same contrast with a different "combination" of the modulation of the refractive index and mean refractive index.

In particular, when a plurality of concatenated gratings are written, the energy density is not generally constant for each of the gratings. Such an effect is illustrated in FIG. 2a, which shows the index modulation $\Delta n_{mod}$ and the mean refractive index $\Delta n_{mean}$ along the filter. As illustrated in FIG. 2a, the mean refractive index $\Delta n_{mean}$ is not constant along the filter. This results in giving rise to different changes over time in the various spectral components of the filter. These changes are also difficult to predict and can give rise to substantial changes in the spectral profile of the filter, which is then no longer adapted to the equalisation of the amplification of the DWDM transmission channels for which it was intended. This deformation of the spectral profile over time is particularly visible during the burn-in step, known by the term "annealing", as illustrated in the graph in FIG. 2b, which shows the spectral response of the filter before (bold line) and after (fine line) the burn-in step. This is because, during the burn-in the filter is artificially aged in order to stabilise its spectral response and, for this purpose, each of the two (modulation of the refractive index $\Delta n_{mod}$ and mean refractive index $\Delta n_{mean}$) is varied in order to then arrive at two different combinations which will give different contrasts and wavelength shift for each of the elementary filters.

A second object of the invention is to respond to this problem of the variation in the mean refractive index of the flattening filter and to propose a complex filter having a constant mean refractive index.

To this end, the invention proposes to produce a gain flattening filter composed of a concatenation of elementary filters, each elementary filter consisting of a chirped slanted Bragg grating apodised in a controlled manner in order to obtain a uniform mean refractive index, the said mean refractive index also being constant over all the concatenated gratings.

Such a filter can be obtained by means of successive irradiations of slanted Bragg gratings through a single chirped phase mask. Each irradiation of a given area of the phase mask makes it possible to produce an elementary filter corresponding to a spectral portion of the complex flattening filter. Each elementary filter is written in a controlled manner, that is to say is apodised, in order to have the same irradiation time and thus the same mean refractive index, despite the different contrasts of each of the said elementary filters.

The flattening filter according to the invention therefore has the advantage of being produced by writing through a single phase mask, which affords control of the apodisation of each elementary portion of the filter and avoids modification to the spectral profile of the filter following the burn-in step.

The present invention concerns more specifically an optical filter composed of a concatenation of elementary filters consisting of chirped slanted Bragg gratings written on a continuous portion of an optical waveguide, characterised in that the various gratings in the concatenation have the same angle, identical lengths and a linear chirp.

According to one characteristic, the chirp of the various gratings is linear over the entire concatenation.

According to one characteristic, each elementary filter in the concatenation is apodised with a uniform mean refractive index, the said mean refractive index being constant over all the gratings in the concatenation.

The invention also concerns a method of writing an optical filter on a portion of an optical waveguide, characterised in that a plurality of elementary filters consisting of chirped slanted Bragg gratings are written through a single chirped phase mask so as to form the optical filter by concatenation of the said elementary filters, each grating being written through a slot moved along the phase mask.

BRIEF DESCRIPTION OF THE FIGURES

The particularities and advantages of the present invention will emerge more clearly from a reading of the description which follows, given by way of illustrative and non-limiting example, and made with reference to the accompanying figures, in which:

FIG. 1, already described, illustrates schematically a gain flattening filter obtained by a technique of the prior art;

FIG. 2a, already described, is a graph of the modulation of the refractive index and mean refractive index of a filter according to a first embodiment of the invention;

FIG. 2b, already described, is a graph illustrating the change in the spectral response of a filter according to a first embodiment of the invention before and after the burn-in step;

FIG. 3 illustrates schematically the writing of a gain flattening filter according to the present invention;

FIG. 4 is a graph illustrating the spectral components of a filter according to the invention;

FIG. 5a is a graph of the modulation of the refractive index and mean refractive index of a filter according to a second embodiment of the invention;

FIG. 5b is a graph illustrating the stability of the spectral response of a filter according to a second embodiment of the invention before and after the burn-in step;

FIG. 6 is a diagram illustrating a method of manufacturing the filter according to the invention.

DETAILED DESCRIPTION OF THE INVENTION

The filter according to the invention, as illustrated schematically in FIGS. 3 and 4, is composed of a concatenation of elementary filters 10 written on a continuous portion of an optical waveguide through a single chirped phase mask 50, that is to say one whose period varies along the mask.

The waveguide comprises the filter according to the invention and can be an optical fiber or a waveguide produced in planar technology.

According to an essential characteristic of the invention, the concatenation of the elementary filters takes place without changing the mask, but simply by moving a slot 60 along the chirped mask and the optical guide.

All the elementary filters 10 therefore have the same angle and have identical lengths, defined by the width of the slot, and the same chirp defined by the phase mask used. In addition, the chirp between the various gratings is linear over all the concatenation.

Advantageously, the rate in variation of the period or "chirp rate" of the mask is determined so as to cover the entire spectral flattening width required whilst having a reasonable filter length, that is to say one limited to 30–40 mm. For example, a linear chirp of the mask of 10 nm/cm, with a movement of the slot 60 of between 1 and 5 mm between two consecutive writings, is adapted to a gain flattening on the C band.

The position of the writing beam 70 on the mask defines the centre wavelength of each elementary filter 10 and the contrast of each of the said elementary filters is fixed by combining the components of the modulation of the index $\Delta n_{mod}$ and of the mean refractive index $\Delta n_{mean}$, as explained above.

Thus, by concatenating these elementary filters 10, it is possible to obtain a complex flattening filter 20 whose spectral response is the sum of the spectral responses of the concatenated elementary filters 10 and which can respond to a complex flattening template.

According to one characteristic of the invention, each elementary filter is also apodised with a uniform mean refractive index, the said mean refractive index being constant over all the gratings in the concatenation.

The mean refractive index $\Delta n_{mean}$ is fixed so as to be constant for each elementary filter 10 by imposing a different apodisation for each elementary filter so as to guarantee the same irradiation time whatever the contrast of the elementary filter. Such an operation is possible since, according to the invention, the elementary filters are written through the same phase mask.

Making the mean refractive index $\Delta n_{mean}$ constant along the complex filter, as illustrated in the graph in FIG. 5a, results in stabilising the change over time in the various spectral components of the filter and allowing an almost homothetic change in the spectral response of the complex filter with the burn-in step, as illustrated in the graph in FIG. 5b.

There are many methods of apodising filters. For example, one known technique, illustrated in FIG. 6, consists of using a translation support 80 for making the mask 50 vibrate in front of the writing beam 70. The translation support 80 can be actuated by piezoelectric devices for example. The relative movement of the mask 50 and fibre 40 during the writing of the elementary grating on the optical guide 40 makes it possible to control the effectiveness of writing of each elementary filter and makes uniform the energy density received by the complex filter during the irradiation of the guide 40 by the laser beam 70.

There are also other apodisation techniques available to those skilled in the art, such as for example apodised masks designed to make uniform the energy density received by the guide in the grating writing area. It is this making uniform of the energy received by the optical guide in the writing area which makes it possible to obtain a mean refractive index $\Delta n_{mean}$ which is uniform over the length of the elementary grating written.

However, according to the invention, the various elementary gratings are written through the same phase mask 50 by moving the slot 60. Thus the apodisation of all the elementary gratings in the concatenation of the complex filter can be controlled so that the mean refractive index $\Delta n_{mean}$ of each elementary grating is constant over the entire length of the concatenated filter.

What is claimed is:

1. An optical filter composed of a concatenation of elementary filters consisting of chirped slanted Bragg gratings written on a continuous portion of an optical waveguide, characterised in that the various gratings in the concatenation have the same angle, identical lengths and a chirp, and further characterised in that each elementary filter in the concatenation is apodised with a uniform mean refractive index ($\Delta n_{mean}$), the mean refractive index being constant over all the gratings in the concatenation.

2. An optical filter according to claim 1, characterised in that the chirp of the various gratings is linear over the entire concatenation.

3. An optical filter according to claim 1, characterised in that the optical waveguide is an optical fibre.

4. An optical filter according to claim 1, characterised in that the optical waveguide is a planar waveguide.

5. A method of writing an optical filter on a portion of optical waveguide, characterised in that a plurality of elementary filters consisting of chirped slanted Bragg gratings are written through a single chirped phase mask so as to form the optical filter by concatenation of the said elementary filters, each grating being written through a slot moved along the phase mask, and further characterised in that the writing of each grating constituting an elementary filter is apodised to produce a uniform mean refractive index, the mean refractive index being constant over all the gratings in the concatenation.

6. A method of writing an optical filter according to claim 5, characterised in that the movement of the slot is between 1 and 5 mm between two consecutive writings.

7. An optical gain flattening system comprising an optical filter composed of a concatenation of elementary filters consisting of chirped slanted Bragg gratings written on a continuous portion of an optical waveguide, characterised in that the various gratings in the concatenation have the same angle, identical lengths and a linear chirp, and further characterised in that each elementary filter in the concatenation is apodised with a uniform mean refractive index ($\Delta n_{mean}$), the mean refractive index being constant over all the gratings in the concatenation.

8. An optical filter according to claim 1, wherein each elementary filter in the concatenation has a different apodisation.

9. A method of writing an optical filter according to claim 5, wherein the apodisation of each elementary filter is achieved using the same irradiation time.

10. An optical gain flattening system according to claim 1, wherein each elementary filter in the concatenation has a different apodisation.

* * * * *